April 9, 1963 J. H. LEMELSON 3,085,130

RECORDING AND REPRODUCTION APPARATUS

Filed March 24, 1958 3 Sheets-Sheet 1

INVENTOR.
JEROME H. LEMELSON
BY

RECORDING AND REPRODUCTION APPARATUS

Filed March 24, 1958 3 Sheets-Sheet 2

INVENTOR.
JEROME H. LEMELSON
BY

INVENTOR.
JEROME H. LEMELSON
BY 3,085,130

RECORDING AND REPRODUCTION APPARATUS

Jerome H. Lemelson, 43A Garfield Park Apts., Metuchen, N.J.

Filed Mar. 24, 1958, Ser. No. 723,591
10 Claims. (Cl. 178—5.6)

Figure 1:
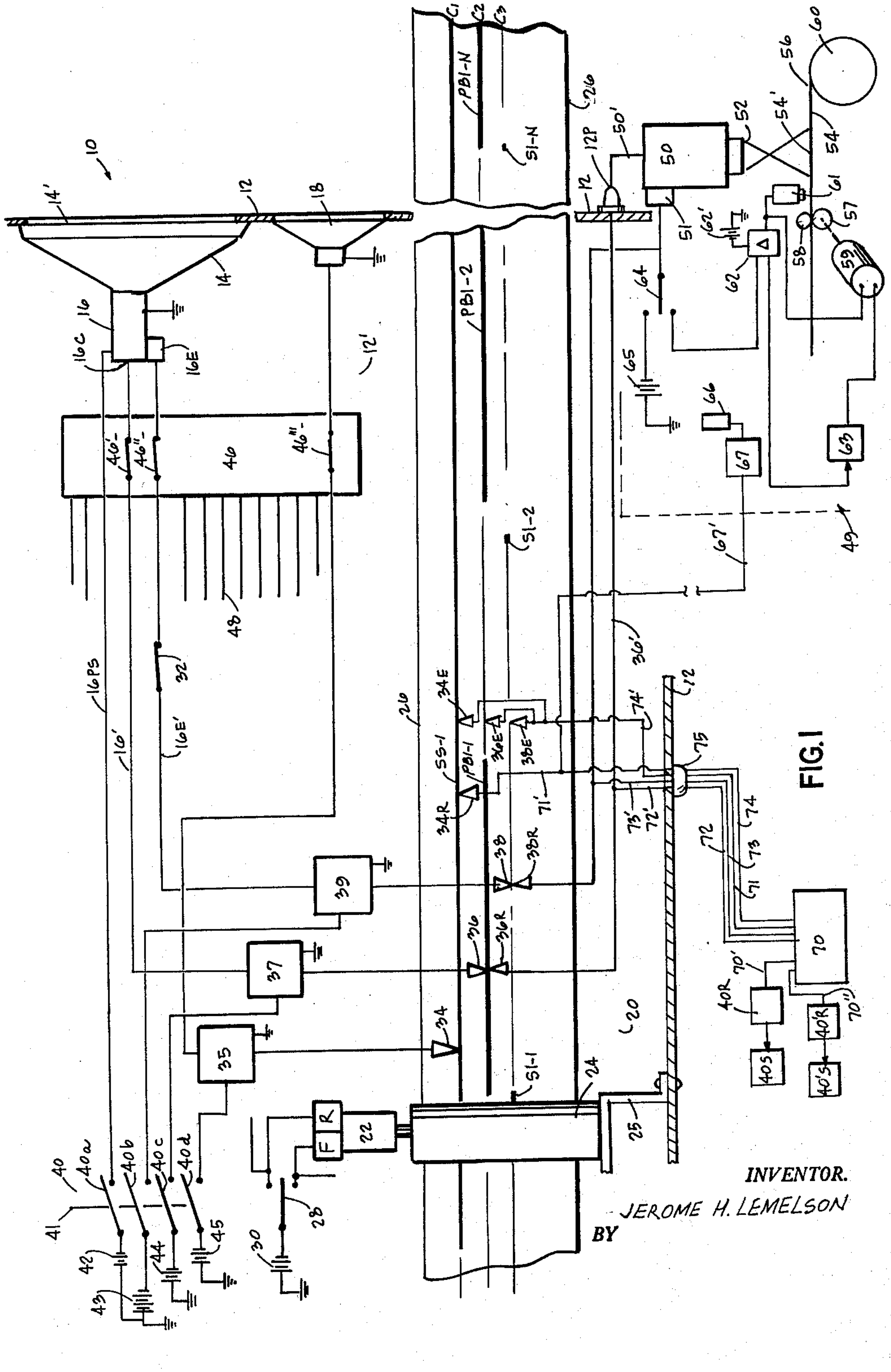

This invention relates to magnetic recording and reproduction apparatus and in particular to apparatus adapted for recording and reproducing audio and video signals.

In the performance of many human communicative functions such as teaching, advertising, entertaining or other functions involving the transfer of vocal or audio information, said information is most easily grasped or absorbed by human beings by the utilization of visual aids as means for supplementing a vocal teaching or description. Motion pictures have been employed quite widely to teach together with an accompanying sound reproduction but have a number of shortcomings namely that the film and projection apparatus is expensive, requires a darkened room as well as relatively large reels of film to teach a subject of any extended duration. Television has also been employed though it requires the attendance of human beings at the transmitting station. The provision of a motion picture and sound reproduction unit at the transmitter or picture signal generating station has also been employed to advantage though certain shortcomings in such apparatus are noted. If film is employed for reproducing motion picture in the form of a plurality of video picture signals expensive scanning and reproduction equipment is necessary and the duration of a program is limited by the length required of said film. The use of video magnetic tape for reproducing motion pictures from a plurality of signals recorded thereon requires a relatively complex tape transport and driving means as the relative speed of the tape and reproduction head is in the range of 15 to 20 feet per second and precise control of said speed must be maintained. The above short-comings are of prime importance where the cost of such equipment is an important consideration as well as considerations regarding the space-volume occupied by said equipment.

According to this invention, a magnetic tape and transport of simple design are provided with a plurality of different signals recorded on one or more tracks of said tape which signals preferably include an audio signal of extended duration which may be recorded along all or most of the length of said tape, a plurality of video picture signals each recorded on different sections of said tape in predetermined relation to said audio signal and each preferably derived from the picture signal output of a video camera or flying spot scanner during the sweep of at least one image frame by the beam thereof, and a plurality of sync signals for performing one or more operations to be described such as effecting the erasure of an image screen or intermediate storage element or the triggering of the writing means of said image screen. An image storage means such as a conventional video image storage tube capable of holding or retaining an image on a viewing screen thereof until erased therefrom is employed for reproducing the image of said signal as a still picture for use as a visual aid or display to accompany and/or illustrate what is being described verbally by that part of the audio signal reproduced therewith.

If the video signals recorded on the magnetic tape are those reproduced by a so called slow scanning video camera (i.e. one in which the scanning-read beam takes 2 to 5 seconds to scan a single frame or image field), then the tape may be driven at conventional audio reproduction speed and ordinary audio magnetic recording and reproduction apparatus with some minor modifications may be employed. In this manner, the cost of apparatus for recording and reproducing video and audio signals is kept to a minimum and a display-sound reproduction device is derived at low cost.

It is accordingly a primary object of this invention to provide a new and improved apparatus for recording and reproducing sound and picture information for the purposes of teaching, amusing, displaying or advertising.

Another object is to provide an improved apparatus for recording and reproducing a message with one or more visual images provided accompanying said message which images are reproduced and viewable on a screen by persons listening to said sound reproduction, said apparatus being capable of having recordings easily and rapidly changed without the need to change or replace the recording medium or to provide film or photographs for said picture reproductions.

Still another object is to provide a new and improved animated display advertising or educational apparatus which is capable of rapid editing or changing either locally with respect to said apparatus or from a remote location without the need for human attendance at said apparatus and without the need to change record mediums.

Yet another object is to provide an apparatus which may be used either as an educational device or an amusement device which provides a plurality of sound reproductions such as compositions of music or the like as a continuous playing for listening pleasure or educational purposes with an accompanying plurality of visual image reproductions appearing on a screen at predetermined intervals and related in some manner to the part of the sound reproduction it appears with, said pictures being automatically made to appear and disappear from said screen as said sound reproduction continues.

Another object is to provide apparatus for recording and reproducing a plurality of images from magnetic tape for display and educational purposes whereby a relatively smaller quantity of tape than used for conventional video tape recording will suffice for providing programs of extended duration.

Still another object is to provide an improved and simplified system for recording and reproducing video picture signals as a plurality of images using magnetic recording and reproduction equipment of the type used to record and reproduce audio signals thereby eliminating the need for a complex system of speed control and expensive tape transport means.

A further object is to provide simple and improved magnetic recording and reproduction apparatus employing a video viewing screen and applicable to coin operative amusement or educational devices such as juke boxes, and the like.

Other features of the invention will be understood from the accompanying drawings, following descriptions and claims.

Figure 2:
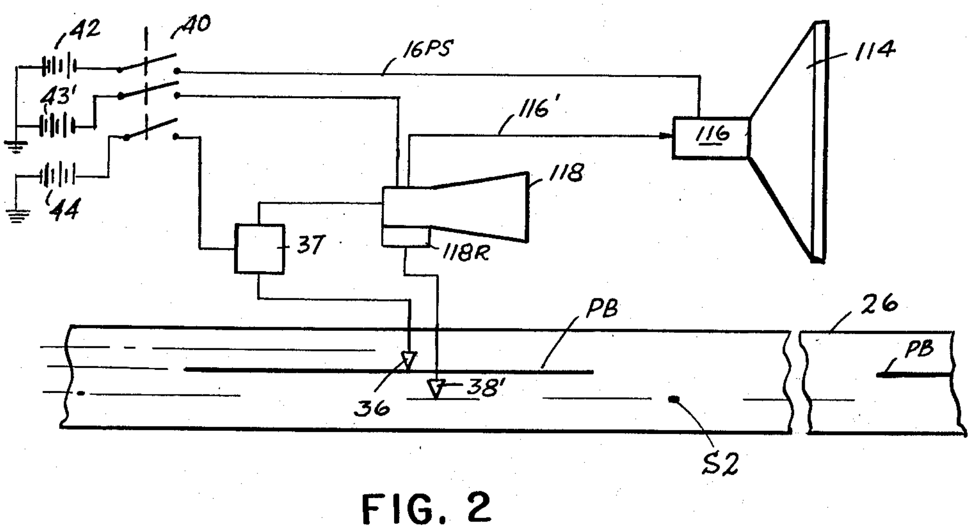
Figure 3:
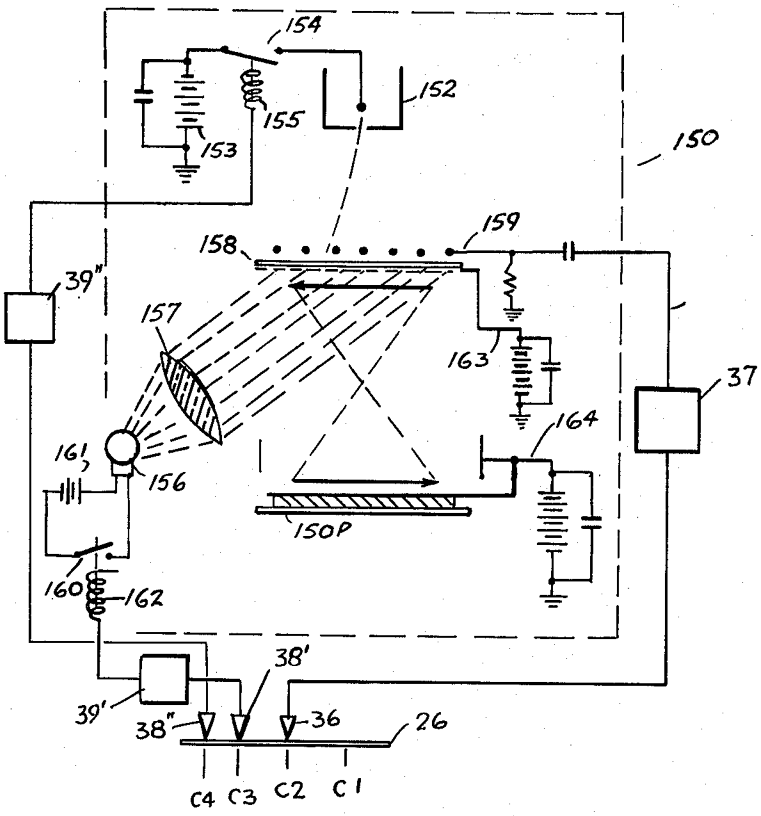
Figure 4:
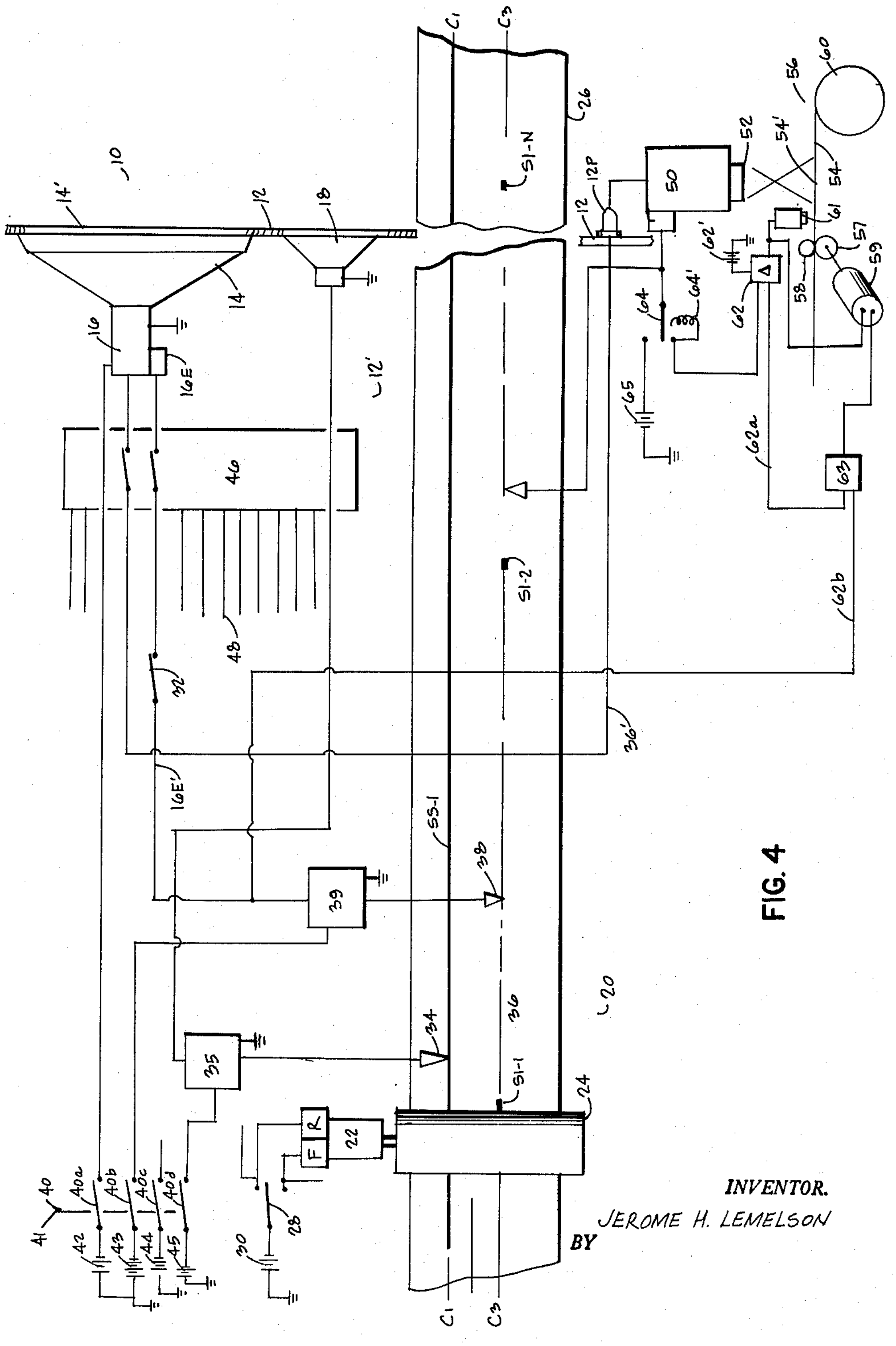

FIG. 1 is a schematic diagram of an audio-video recording and reproduction system constructed in accordance with the invention; FIG. 2 is a schematic diagram showing a modification in the system of FIG. 1; FIG. 3 shows details of modifications to a video storage means applicable to the apparatus of FIG. 1; FIG. 4 is a schematic diagram of a further modification of the apparatus of FIG. 1.

The audio-video apparatus 10 of FIG. 1 comprises a cabinet 12 or other type of enclosure having one or more video picture generating means 14 which may comprise a cathode ray storage tube of conventional design or a flat plate type of video storage screen having means for creating a visual image on face 14' thereof as the result of the modulation of a so called "writing beam," the electrons of which strike a phosphorescent material on the rear face of the wall 14'. Also provided as part of the apparatus 10 are one or more loud speakers 12 for the transducing of audio signals as a continuous or intermittent sound from a magnetic tape 26; a transport for said tape represented in part by drive-gearmotor 22 turning capstan 24 which frictionally engages 26 against a depressor wheel 24; both of which and including the necessary idlers, supply and takeup reels or drums for said tape and motors for driving said reels are supported on a frame 25 secured in housing 12. Further equipment illustrated in FIG. 1 includes a plurality of magnetic transducers 34 to 38 for recording, erasing, and reproducing signals on or from a plurality of tracks C–1 to C–N of 26 on which said transducers ride, reproduction amplifiers 35, 37, and 39 for amplifying respective signals transduced from 26, a plurality of switches 40 for connecting respective power supplies with said amplifier and control circuits and apparatus referred to by the notation 49 for recording new signals on predetermined areas of 26 which will be described.

Although a conventional, continuous slow scan cathode ray tube may be employed for 14 it is preferably a storage tube adapted for effecting a so called slow writing scan and includes means for holding or storing an image once written thereon until an erasure or image obliterating input 16E thereto is energized. The neck part 16 of tube 14 is assumed to contain all the beam deflection circuits including the vertical and horizontal deflection chains, beam modulating means responsive to an input picture signal on line 16', screen charge holding circuits and the like which are necessary to cause an image to be formed on the viewing screen 14' in response to a picture signal reproduced from tape 26 and fed to the input 16C of the writing gun in 16. While the tube 14 may be any conventional viewing storage tube adapted to produce images of the desired definition and utilizes a control 16E which when energized by a signal input thereto causes erasure of the charge pattern or image from the target screen 14', said tube may also be of a type in which erasure of one still image from its viewing screen phosphors is effected automatically with each successive sweep of the writing beam, hence eliminating the need for a separate erasing action as will be described. A cathode modulation type viewing storage tube may be employed for 14 having the target areas of its image screen shift to the new equilibrium potential when bombarded by the write beam which is modulated by the new picture signal. Reference is made to the text "Storage Tubes," by Knoll and Kazan, for details of this and other types of viewing storage tubes which may be applied to perform the function of 14. It is noted, although not illustrated, that a plurality of such tubes may be provided mounted at different attitudes on or within the housing 12 for viewing from different angles relative to the device 10 each of which may be operatively connected to the input line 16'.

If the apparatus of FIG. 1 is to be used as a coin operated amusement device, the walls 12 are preferably formed in an oblong upstanding housing or cabinet having 14 mounted near or on the top thereof, a selection switching means accessible below said screen for selecting one of a plurality of recorded groups of picture and audio signals, and the speaker mounted below or on the side of the said viewing tube or screen or directly below said selection switches. Plural viewing screens and speakers may also be provided on top.

The tape 26 may be of the endless or closed loop type having a drive including one or more reels. Said tape is shown having three channels or tracks, C–1 to C–3, although additional channels and respective transducing means may be provided depending on the complexity of the signals recorded thereon, and whether or not it is desired to select different signals from different channels for transducing a sound or picture.

The basic signal recordings of the invention are shown in their approximate relative positions in FIG. 1 on the tape 26 which figure is not drawn to scale and is presented only to indicate relative signal positioning. The relative lengths of the picture signals illustrated as being recorded on 26 are also not to scale for the same reason. Said recorded signals include an audio signal SA–1 of extended duration such as a musical and/or voice recording which is preferably recorded on all or the major part of the length of channel C–1. Recorded on an adjacent channel C–2, each of which is preferably spaced apart thereon a distance from the others are a plurality of picture signals PB1– which have preferably been derived from read beam screen sweep of a conventional video scanning camera or flying spot scanner preferably operating at a so called "slow" scanning rate requiring one to several seconds or more to scan an image field as compared to the conventional 30 scanning frames per second which for interlaced scanning comprises sixty beam sweeps per second. While a signal derived as the result of a slow scanning rate will permit the simplification of the recording and reproduction apparatus of FIG. 1, the signals PB– may be those derived from conventional camera scanning equipment during a single or plural image field scanning sweeps of its beam. Said signal recordings PB– may be so called "composite" video picture signals containing the necessary blanking and sync components depending on the beam control means provided in 16.

Provided on a third channel or track C–3 are a plurality of signal recordings S1– of limited duration with at least one signal recorded in a predetermined position relative to each respective picture signal PB–. The signals S1– are provided to effect erasure of the image generated on the viewing face 14' of picture tube 14 by the prior picture signal which was reproduced from 26 and/or to condition the deflection and control apparatus in 16 and 16E for receiving a new picture signal.

In the reproduction operation of the apparatus 10, the sound-picture playback is initiated by closing switch 40*a* which connects a power supply 42 with the beam deflection circuits apparatus of 14; switch 40*b* which connects a power supply 43 with the reproduction amplifier 39 and; switch 40*c* connecting power supply 44 with the power input to reproduction amplifier 35. These switches are preferably connected by a single actuator 41. A double throw switch 28 is used to start the drive 22 for the tape connecting the power supply (30) to either the forward control or input F of 22 or the reverse input R thereof depending on how 28 is actuated.

If the apparatus 10 is to be coin operated, all of said switches 40 are preferably operated simultaneously in response to the dropping of a coin in the slot of a coin operated switch or in a predetermined sequence controlled by an automatic multicircuit recycle timer initiated by the actuation of said coin operated switch. The above action may be effected after selecting one of a plurality of different recordings to be played back.

Upon starting, the tape 26 moves relative the heads 34, 36, and 38 and, depending on whether it is desired to first produce a sound through speaker 18 or provide a picture on screen 14' the sound signal recorded on C–1 or the first picture signal is first reproduced from 36. A preferable mode of operation is as follows. Since attention will be drawn to the apparatus and the screen 14' after a sound is reproduced, the sound recording SA– is preferably the first reproduced by its transducer 36 followed at any predetermined time thereafter by reproduction of the first picture signal PB1–1. Since the storage tube 14 may not be conditioned for writing or the writing face of its image screen may have noise or other images thereon, an erase signal S–1 is preferably reproduced by head 38 amplified in 39 and passed to the input of the erasure control 16E which automatically, in response to said signal S–1 causes the face of 14 to be erased and conditions said tube for receipt of the first picture signal. Thereafter picture signal PB1–7 is reproduced by head 36, amplified in reproduction amplifier 37 and fed therefrom to the beam modulating signal input of 14 over line 16'. Reproduction of the entire signal PB1–1 causes a picture to be "written" on the face of 14 which persists until 16E is next energized. The still picture or image frame is preferably related to what is being reproduced from C–1. Said sound may comprise a voice description of the picture provided on 14'. Said picture may be maintained on the image face of 14 for any desired period of time and may be automatically erased therefrom by reproducing a second signal such as S–2 from C–3 and using it to again energize the erasure control 16E. Thus the image on 14' may be automatically changed in accordance with changes in the audio recording SA–, for example, as or before a message reproduced from C–1 changes and begins to describe the subject pertaining to a new picture or image field.

The picture signals PB1– are thus preferably spaced a distance apart on 26, the spacing depending on the time it is desired for each image to persist on screen 14'.

If the apparatus 10 is to be used to test the power of observation of a viewer, the picture signals PB– may be derived from faster scanning cameras and the persistency of said image may be substantially reduced by providing signals S–1 to effect quick erasure or conventional automatic low persistency means may be employed.

The notation 46 refers to a selection system for connecting the respective lines 16', 16'' and 16E' extending from the inputs 16C, 16E and speaker 18 to a selected of a plurality of recording channel groups of which C–1 to C–3 is one group. The narrow tape 26 may be replaced by a wide band tape containing said plurality of other channels on which may be recorded other audio, picture and control signals for selective playback of a particular audio-picture signal group or plural tapes such as 26 may be provided each containing a particular audio-picture signal group and respective reproduction means therefore, connectable, through a selection system 48 to the video picture reproducer 14 and loudspeaker 18. The notation 48 refers to other circuits connectable to the selection system 46 and each extending from reproduction amplifiers such as 35 to 39 or from reproduction heads similar to 34, 36 and 38 whereupon the amplifiers located on the side of the switching system lead to the video tube and loudspeaker. Such a selection system may be applied to an entertainment device such as a juke box whereupon switch 40 would be coin operative and 28 would be included with 40.

Also illustrated in FIG. 1 are two means for providing the described and illustrated recordings on the magnetic tape 26 without the need for removing said tape from the housing or cabinet 12. Two systems are illustrated for automatically erasing all noise or information signals from the tape 26 and recording a plurality of new signals in predetermined position thereon. One system, referred to by the notation 49 comprises, a video scanning camera 50 and related video sync signal generating circuits which provides, when operative, a composite video picture signal on an output circuit 50' which is connectable via a plug 12P to a circuit 36' extending to a recording head 36R riding on channel C–2 for recording said picture signals thereon. Both an automatic and a manually operative means for effecting the recording of the plural picture signals on channel C–2 are provided in the transcribing unit 49 which is preferably housed in a portable cabinet. For manual operation, the desired picture or still image is provided in the scanning field 54' of the camera 50 and the signal generating means is triggered or made operative thereafter at the desired instant to provide said picture signal on the output line 50' wherefrom it passes to the magnetic recording transducer 36R for recording on channel C–2. This may be effected as the operator listens to the sound reproduced from channel C–1 and effects said picture signal recordings at predetermined points in the sound reproduction by actuating a switch 64. Actuating 64 in one direction gates a power supply 65 to energize the scanning beam deflection control 51 which triggers the deflection chains causing the beam of the image tube in 50 to start sweeping its raster scanning path preferably at a slow scanning rate or speed taking from 2 to 5 seconds to scan the screen depending on the speed of operation of the tape and the definition required of the resulting image. The control 51 of camera 50 may be adapted to return the scanning beam of the image field scanning tube of 50 to a starting position until next triggered or energized or a switch may be provided in the output line 50' to deenergize the line 36' once scanning has been completed, said switch being operated by manual means by the operator or by means of a time delay relay to open a predetermined time after 64 is closed. The switch 64 is also shown as completing a circuit between the power supply 65 and an input line to the recording head 38R for recording the mentioned S1– signals on channel C–3 each time 64 is closed. The notation 66 refers to a microphone for recording verbal audio signals on C–1 through a recording head 34R riding on C–1. The microphone 66 is connected to a recording amplifier 67 having an output line 67' which is pluggable with the input circuit to 36R. Educational, display or advertising apparatus may thus be provided which provides a series of still images on the viewing screen of tube 14 at different times after the starting of said apparatus with an accompanying voice reproduction describing or otherwise related to each image as or before it appears. The picture signals may be recorded first in this instance with the voice signals provided by the operator or both picture and audio signals may be recorded simultaneously.

The transcribing unit 49 also contains means for providing said plurality of picture signals on tape 26 at predetermined intervals or positions thereon. A tape, film or belt 54 containing individual still images is intermittently moved through the image field 54' and stopped with each picture thereof centered in said field. The tape or film 54 is driven on a transport 56 illustrated in part by the take-up reel or drum 60, and drive 57, 58 for said film operated by a motor 59. The take-up reel 60 is also driven by a motor, not shown, but which for the purpose of simplifying the drawing may be considered to be operative by motor 59. The motor 59 has start and stop control inputs which when respectively energized by pulses on their inputs cause said motor to respectively start and stop the motion of the transport and hence the motion of the film. Control of the operation of 59 may be effected by manually closing and opening a switch or switches or by the automatic means illustrated which includes a relay 61 such as a photoelectric relay scanning an edge track of 54 containing markings for providing an output signal from 61 when the next picture or image on 54 becomes centered in field 54'. The output from 61 is passed to the stop control of 59 and to a time delay relay 62. The latter is adapted to provide a signal at a predetermined time after becoming operative through switch 64 to the trigger input 51 of 50 and to the recording head 38R. An output of 62 or pulse is also passed to a second time delay relay 63 having a time constant such as to provide a signal for starting the drive servo means 59 at some time after the camera scanning means has completely scanned the field 54' and the described cycle is automatically repeated thereafter.

Also shown in FIG. 1 is apparatus for automatically recording said picture, audio and sync signals on tape 26 without the need for manual operation of switches for starting and stopping said tape motion or for performing the other described functions. The notation 70 refers to a receiver for said signals or multiple receivers or other means for producing said signals on multiple output circuits therefrom which are referred to by the numerals 71 to 74. Notation 70 may also refer to a magnetic recorder and reproducer such as 10 having outputs 71 to 74 similar to 16′, 16″ and 16E of FIG. 1. 70 may also represent a radio receiving means adapted to receive and provide over said outputs 71 to 74 plural picture, audio and sync signals to be described and to provide them at respective inputs 71′ to 74′ for recording the described signals on tape 26. Notation 70 may also comprise a plurality of recording amplifiers each connected to a respective terminal line or voice pair in an automatic telephone switching system and operative for the receipt of said signals to effect their automatic recording on tape 26. The lines 71 to 74 are shown are being pluggable via a male and female plug 75 to the circuits 71′ to 74′ so that 70 may be removed from the vicinity of 12 when the desired recording is effected. The device 70 will hereafter be referred to as a signal generator and it is assumed that it may be any known type of receiving or reproduction apparatus capable of providing on respective of said multiple outputs audio, video, sync or erasure signals at predetermined times during the transcribing function.

Operation of the transcribing means 70 is effected in the following time sequence. A first output circuit 70′ thereof first becomes energized and activates a relay 40R actuating a solenoid 40S which operates a switch actuating arm 41 closing all switches 40–. Thereafter audio, video, sync and erase signals are provided on the respective circuits 71, 72, 73 and 74 which are transmitted to the respective heads 34R, 36R and 38R over circuits 71, 72 and 73. The output line 74 is maintained energized continuously while transcribing is effected to energize erase heads 34E, 36E and 38E which effect magnetic erasure of all prior signals on the channels C–1, C–2 and C–3 as the tape moves from right to left. The described audio, video and sync signals are reproduced on the circuits 71 to 73 during time intervals necessary to effect the described recordings on 26. When all desired signals have been recorded on 26 a sixth output line 70″ of 70 becomes energized with a signal energizing a relay 40R′ which actuates a solenoid 40S′ opening switch 40 by moving bi-stable switch arm 41. In a simple form each of the circuits 70′, 70″ and 71 to 74 may be the outputs of respective magnetic reproduction transducers riding on a tape or other recording medium travelling at a constant speed past said transducers and adapted to reproduce therefrom said respective described signals for recording through the respective recording heads of 10.

A disadvantage in using the apparatus of FIG. 1 with the picture signals PB– recorded on C–2 and reproduced therefrom at a so called slow scanning rate, such as one which requires 2 to 5 seconds to intensity modulate a single image field or frame sweep of the video viewer 14, is that the viewer sees the process of the image being slowly formed on the face of the tube or screen 14. The phenomenon may be eliminated by the means illustrated in FIG. 2 wherein an intermediate storage device or tube 118 is provided for receiving and storing the signal reproduced from tape 26 at so called slow rate and provides said signal or a reproduction of the charge pattern of said signal on its storage element, at a much higher frequency to the writing gun input 116C of a video storage tube 114. The time required to write the image on the viewing screen rear or target area 114T of 114 may be $\frac{1}{30}$ of a second or standard video frequency or a little longer provided that the automatic deflection control means 118R of the read beam of 118 is operated at the desired frequency. To do this, it is necessary that the deflection chains or controls of the deflection of the read and write beams of 118 be separate units. The read beam of 118 will contain sweep and blanking units with multivibrators or pulse generators for generating the horizontal and vertical deflection signals at the desired higher frequency than the frequency of the signal reproduced from channel C–2 of 26 and fed through amplifier 37 to the input 118′ of the writing gun for storage tube 118. The notation 118R refers to the read beam automatic deflection control of storage tube 118 and 118TR to a monostable, normally open, slow-to-open after closing switching means between the read beam deflection circuits of 118 and the respective deflection means which when energized by a trigger signal reproduced from channel C–3 of tape 26 gates said deflection signals to the respective read beam deflection means of 118 creating the picture signal of the charge pattern stored on the target or storage element of 118 on line 116′ which terminates at the modulating signal input to the writing gun of the storage tube 114. The trigger signal for energizing the read beam control 118R is provided as a magnetic recording of a pulse signal on C–3 in a position such that it will be reproduced by 38′ and trigger said read beam control relay 118TR at some time after the entire related picture signal PB– has been reproduced from 26 and passed to 118. The deflection control trigger signals S2– may replace the prior mentioned erase signals S1– if the tube 114 is of the described self erasing type in which erasure of a prior image from its target phosphorescent screen is effected by the action of the following beam in its sweep thereacross. The signals S2– may be provided in any desired spatial positions on C–3 provided that they are reproduced a sufficient time before the reproduction of the next video signal to permit the read beam of 118 to complete its sweep or at least to lead the write beam controlled by the next picture signal reproduced from 26. Like 114, the storage or charge pattern of 118 may be automatically erased by the read beam sweep or the action of the following write-beam. A so called clock, pulse generator or timer of the self resetting type may replace the reproduction head 38′ for energizing the read beam control 118TR although this reduces the flexibility of the apparatus. By selecting the positions of the signals S2–, the times during which the respective images which appear on the viewing face of 114 may be varied according to what is recorded on channel C–1 regardless of the spacing of the picture signals PB– which signals may be positioned immediately after each S2– signal or in positions to be immediately reproduced after the reproduction of said S2– signals.

Shown also in FIG. 2 is a means for automatically erasing any signal which may remain on the storage element or screen of 118. The trigger signal reproduced by 38′ is also utilized to energize a time delay relay 120 which provides a signal output after sufficient time has elapsed to permit the completion of the read beam sweep of 118, said delay signal being passed to the automatic erasure control 120 of 118 to condition the tube for receiving the reproduction of the next picture signal PB and storing it on its storage element. The remainder of the circuitry of the apparatus of FIG. 2 is similar to that illustrated in FIG. 1.

Several variations are noted in the apparatus of FIGS. 1 and 2. For example, the control signals S1– and/or S2– may be provided on either of the recording channels C–1 or C–2. If provided on C–1, they are preferably of a frequency above the audio range and the respective relays they actuate are preferably responsive only to said above audio frequency signals. The picture signals PB– may also be combined with the audio signal on one track and the pulse signals may also be provided on the single track provided that the necessary filter and/or clipping means are used to separate the respective signals once reproduced. The video picture signals may be derived from more than one screen sweep if necessary to effect the desired writing or charging of the respective storage tubes. The picture signals may also contain the necessary frame blanking signals as well as all the necessary deflection sync signals, depending on the controls provided to effect these functions. It is assumed also that all the necessary power supplies are provided on the proper sides of all switches, amplifiers, relays, motors, and deflection means if not illustrated.

FIG. 3 shows apparatus similar to that illustrated in FIG. 1 with modifications provided thereto for the control of the manner in which the viewing image appears and disappears from the face of a viewing screen. Since the apparatus of FIG. 3 is applicable to FIG. 1 apparatus and circuits not shown in FIG. 3 may be derived by reference to FIG. 1.

The numeral 150 refers to a photoelectric, halftone viewing storage tube having a viewing screen 150P backed by a viewing phosphor on which a viewable image is formed when a target 158 is uniformly flooded with light from an external source 156. The tube, a collector modulation type employing equilibrium writing, grid controlled reading and a double sided target 158 employs a writing beam gun 152 which is maintained at —6000 volts while the picture signal is applied to the collector grid input 159. Erasure is effected automatically when a new input signal is applied to the input 159 so that it is not necessary to provide erasure control signals on the tape 26 as described for the apparatus of FIG. 1. Slow scan writing may be effected of the elements of target 158 without the person viewing screen 150P seeing the slow formation of the image by maintaining the light source 156 off during said writing action. After all target elements have been scanned by the writing beam of electron gun 152 and the collector grid has been modulated by the entire video picture signal reproduced from the tape 26 and passed thereto, the light 156 may be turned on forming a visible image on the viewing phosphor of screen 150P.

In FIG. 3 the light source 156 and action of the writing gun 152 are contrloled by means of signals recorded on the tape 26 which is shown in lateral cross-section as having four recording tracks C–1 to C–4. C–1 contains the described audio signal, C–2 track said plurality of different, spaced apart video picture signals, and C–3 contains control signals positioned such that when reproduced therefrom they may be used to effect turning the light 156 on and off by energizing a relay 162 which closes normally open switch 160 thereby gating a power supply 161 to the light source 156 in series circuit with said switch and power supply. The light passed through a lens system represented by lens 157 floods the surface of 158 and creates an image on the phosphor of 150P. The signals reproduced by pick-up head 38′, amplified in reproduction amplifier 39′ and used to actuate the switch closing relay 162 are each preferably recorded along a sufficient length of channel C–3 to maintain the light 156 energized until it is desired to cause the image recorded on 158 to disappear from 150P just before the new image is desired to be written on said screen, i.e. just before the next picture signal is reproduced from the tape. A fourth reproduction head 38″ is provided to reproduce signals from a fourth channel C–4 which energize a relay 155 closing normally open switch 154 which gates power supply 153 to the cathode of the writing gun 152 at the proper instant and for the required time to effect said writing function, i.e. while the picture signal is being reproduced and applied to the collector grid input 159. The notation 39″ refers to the reproduction amplifier for 38″ and it is assumed that the power supplies to all amplifiers as well as those of the storage tube 150 are gated through a multi-pole switch such as 40 of FIG. 1. For applications where it is desired to cause the image appearing on 150P to gradually brighten in intensity or to fade out rather than abruptly appear and disappear from said screen, the circuit containing 156, 160 and 161 may contain conventional means for slowly raising the intensity of the light given off by 156 after the power source is connected thereto and/or slowly cause said light to dim after 162 is deenergized. The switch 160 may be slow to open across a resistor once 162 is deenergized or control may be effected by means of a slowly heating and cooling control element in lamp 156.

While four channels are illustrated in FIG. 3 for effecting the described control fewer channels may be provided. For example, if the signals recorded on C–4 and C–3 are each of a different frequency or amplitude they may be recorded on a single channel passed to a single amplifier after being reproduced therefrom and after being filtered or clipped used to energize respective relays of the type described. The video and audio signals recorded on channels C–2 and C–1 may be recorded on a single channel provided that they are of a different amplitude or frequency such that they may be separated from each other after reproduction and passed to their respective transducers. In fact all the mentioned signals for FIG. 3 or the other drawings may be recorded on a single channel provided that means are provided in the output of the amplifying means connected to the transducing means for said channel for separating said signals from each other.

It is noted that the control of the light source 156 may be replaced by a gate or shutter in the optical system employing said light. Said shutter may be operated to open and close at the desired instances during playback from the tape by using a solenoid operating relay such as 162 controlled by signal reproduced from track C–3 by head 38′. Throughout the drawings, wherever not shown, it is assumed that the proper power supplies are provided on the proper sides of all switches, amplifiers, electronic and electrical devices and the like. For example, in FIG. 3 the reproduction amplifiers 37, 39′ and 39″ for the respective heads 36, 38′ and 38″ are connected to respective power supplies preferably through a multipole or contact switch such as 40 as are the other power supplies of storage tube 150 so that throwing said one switch actuator will condition the apparatus for transcribing as described. The single switch may be coin controlled. For automatic, coin initiated operation, the switch 28 of FIG. 1 may be operative to start the tape transport drive with the closing of the other contact upon the depositing of a coin in said coin operated switch or relay and the cessation of operation or unlatching of said coin closed relay may be effected by means of a signal reproduced from tape 26, a switch riding on said tape actuated when its switching arm rides into an end-of-recording slot or by means of a resetting time delay relay adapted to become operative at the end of the recording. Said end-of-recording signal may be used to actuate a solenoid, operating switch arm 41 to open or unlatching the relay holding the contacts 40– closed.

Referring once more to FIG. 3, it is noted that the lines 163 and 164 which are respectively the outputs of the power supplies for the perforated photosurface 158 and the metal foil covering the viewing phosphor screen 150P may also be provided with respective normally open or bi-stable switches which are controlled by signals reproduced from respective reproduction transducing heads riding on respective tracks of tape 26 and adapted to close and open said switches by relay or solenoid means responsive to said signals during predetermined intervals during playback transcribing from said tape.

In FIG. 4 the apparatus of FIG. 1 has been modified to permit the picture signals which are utilized for performing the function mentioned in FIG. 1 to be produced by a video camera and fed directly to the storage tube 14 without the need for recording said picture signals on the tape 26. The advantage derived by this procedure, although it requires the use of a camera and means for feeding pictures into the scanning field of said camera, is that rapid scanning may be employed whereby picture signals modulate the writing means of 14 in short time so that the writing action is not viewed and slides or prints may be employed for producing said images on the face of 14.

The picture signal output line 50′ is shown connected directly to the input circuit 36′ extending to the deflection or intensity modulating means of tube 14. It is noted that the provision of said plurality of picture signals may be provided by manual or automatic means. If manually operated, the switch 64 may be closed by hand after positioning a slide or image frame in the scanning field of camera 50. For automatic operation, the film or printed strip 54 may be employed, using a light to illuminate the image field thereof, and utilizing the described means for starting and stopping each frame on 54 in the field of 50. The signal output of the delay relay 62 is connected in addition to the start control 63 for motor or film drive servo(s) 59, to a solenoid 64' for closing switch 64 and thereby triggering the read beam deflection means of 50 to start the beam screen sweep. Since this action provides a picture signal at predetermined but similar intervals and it may be desired to provide said signals at different intervals in accordance with the accompanying sound transcription, a second control means may also be employed and is illustrated. The output circuit 62*a* of delay relay 62 is eliminated and replaced by a circuit 62*b* extending from the output of reproduction amplifier 39 and the sync pulses S1– used to effect erasure of the image from 14 may be employed to energize the start control 63 for servos 59.

It is to be understood that the above described arrangements are illustrative of the application of the principles of the invention. Numerous other arrangements may be devised by those skilled in the art without departing from the spirit and scope of the invention.

I claim:

1. A system for the reproduction of still images from video signal recordings comprising in combination with a magnetic recording member having an elongated recording area, a video reproduction transducer, said magnetic recording member having tandemly recorded on said recording area a plurality of video picture signals, said video reproduction transducer being operatively positioned to pick up video signals recorded on said recording member, a video storage and image generating means including a viewing screen and means for automatically retaining a still image written thereon, said video reproduction transducer being operatively connected to said video storage means to feed video signals thereto, an erasure control means for said video storage means, an input to said erasure control means operatively connected to said reproduction transducer, erasure control signals recorded at spaced intervals on said magnetic recording member in positions to be reproduced and used to energize said erasure control means at intervals prior to the reproduction and passage of each picture signal to said video storage means whereby images recorded in said video storage means are removed therefrom prior to generating a new image.

2. Apparatus in accordance with claim 1 in which said erasure control signals are derived from said video picture signals.

3. Apparatus in accordance with claim 1, in which said erasure control signals are recorded on a third channel of said recording member, an erasure signal pick up means operatively coupled to said third channel and connected to the input of said erasure control means for feeding reproduced control signals thereto at predetermined times during a reproduction cycle.

4. A system for the reproduction of still images from video signal recordings and the reproduction of accompanying audio signals during at least most of a playback interval comprising in combination with a magnetic recording member having a plurality of elongated recording channels, a plurality of reproduction transducers including a video reproduction transducer, said magnetic recording member having tandemly recorded on a first of said recording channels a plurality of video picture signals, audio signals recorded on a second channel, an audio reproduction transducer, a speaker unit, said video reproduction transducer being operatively positioned to pick up video signals recorded on said recording member, said audio reproduction transducer being operatively positioned to pick up audio signals recorded on a second channel of said recording member and being operatively coupled to said speaker unit, a video storage and image generating means including a viewing screen and means for automatically retaining a still image written thereon, said video reproduction transducer being operatively connected to said video storage means to feed video signals thereto, a normally inoperative automatic erasure control means for said video storage means, an input to said erasure control means operatively connected to one of said reproduction transducers, erasure control signals recorded at spaced intervals on said magnetic recording member in positions to be reproduced and used to energize said erasure control means at intervals prior to the reproduction and passage of each picture signal to said video storage means whereby images recorded in said video storage means are removed therefrom prior to generating a new image.

5. Apparatus of the character described comprising in combination with a video storage tube and viewing means including means for retaining a still image generated on said viewing means, a picture signal writing input to said storage means, an erasure control means for said storage means having an input, which when energized, effects the automatic erasure of images from said viewing means, a recording member having an elongated recording track, a plurality of single frame video picture signals recorded in a tandem array on said track, a video signal reproduction transducer operatively coupled to said track, means for driving said recording member relative to said reproduction transducer, a plurality of erasure control signals provided on said recording member, erasure signal reproduction transducing means operatively coupled to said recording member and to the input of said erasure control means, said erasure control signals being provided on said recording member in positions whereby they will be reproduced by said erasure signal transducing means prior to the reproduction of a picture signal for energizing said erasure control means to effect the erasure of the image generated thereon by the prior picture signal prior to the generation of a new image on said storage viewing means.

6. Apparatus in accordance with claim 5, said erasure means including means for causing a gradual fading of the image from said viewing means and being responsive to erasure control signals reproduced from said recording member to cause a gradual fading of the image from said viewing screen of said storage means.

7. Apparatus of the character described comprising in combination with a video storage tube, an image generating and storage viewing screen associated with said storage tube, a picture signal writing input to said tube, an erasure control means for said tube having an input which when energized, effects the automatic erasure of images from said viewing screen, a magnetic recording member having an elongated recording track, a plurality of single frame video picture signals recorded in a tandem array on said track, a reproduction transducer operatively coupled for scanning said track, means for driving said magnetic recording member relative said reproduction transducer, a plurality of erasure control signals each recorded on said recording member, reproduction transducing means for said erasure control signals operatively coupled to said recording member and to the input of said erasure control means and adapted to reproduce each of said erasure control signals prior to the reproduction of a picture signal for energizing said erasure control means to effect the erasure of the image generated thereon by the prior picture signal prior to the generation of a new image on the storage screen of said storage tube.

8. Recording and reproduction apparatus comprising in combination with an erasable recording member having an elongated recording track, transducing means positioned for reproducing from said recording track, a plurality of video picture signals recorded in a tandem array on said track, with each adapted to be separately reproduced therefrom at different times during a playback cycle, a transducer adapted for reproducing said video signals, a plurality of erasure control signals recorded on said recording member with at least one erasure signal recorded in predetermined relation to each of said recorded video signals, a reproducing means for said erasure signals, a video image storage means having a viewing screen, a writing input to said storage means operatively coupled to said transducer and adapted for generating a visible image on said viewing screen when modulated by a reproduced picture signal, an erasure means for removing signals stored in said storage means, said erasure means being operatively coupled to said erasure signal reproducing means, said erasure means being responsive to signals reproduced by said erasure signal producing means and operative to effect erasure of images from said image storage means as each new image is generated on said viewing screen.

9. A video transducing arrangement comprising in combination with a first video storage tube having a recording screen, a recording input to said storage tube, a first beam generating and control means connected to said recording input for recording a video charge pattern on said storage screen, means for generating a first video picture signal on said recording input for modulating said beam to slowly generate a video charge pattern on said screen, means for retaining said charge pattern on said screen, a reading means operative to generate a signal by scanning said screen at a faster rate than that at which said first video signal is recorded, a second video storage tube having a viewing image screen, said second storage tube having a writing input operatively coupled to the output of said reading means of said first video storage tube, scanning control means for said first storage tube operative to effect the control of said reading means to effect at least one complete screen scan in a substantially shorter time than that required to record said charge pattern, a programming means for automatically generating a reproduction control signal after said first video signal has been generated and recorded in its entirety, means for feeding said control signal to said scanning control means to effect the readout of the signal recorded on said screen of said first video storage tube, and means for effecting the automatic erasure of said video charge pattern from said first storage tube recording screen after completely scanning and transducing said picture signal to said second storage tube.

10. A system for generating still images on a video monitor screen comprising in combination with an automatic conveying means for a plurality of recordings which are transducible to respective video signals, video transducing means operatively positioned for scanning said recordings and generating picture signals of each, a video storage means including a monitor viewing screen, said storage means having a writing input adapted when modulated by a video signal to generate an image on said viewing screen, said storage means including means for automatically retaining a still image on said screen recorded in said storage means for a substantial time after the generation of said image, the output of said video transducing means being operatively connected to said writing input of said storage means, an erasure control input for said video storage means energizable to effect automatic erasure of images from said viewing screen, a programming means operatively connected to said erasure control means, said programming means being synchronized in its operation to the operation of said automatic conveying means and adapted for automatically generating an erasure control signal at a predetermined time relative to the generation of a respective picture signal for effecting erasure of images from said monitor screen prior to feeding a new signal to said writing input.

References Cited in the file of this patent

UNITED STATES PATENTS

| | | |
|---|---|---|
| 1,841,540 | Leeming | Jan. 19, 1932 |
| 2,286,540 | Hanson | June 16, 1942 |
| 2,292,307 | Warner et al. | Aug. 4, 1942 |
| 2,381,463 | Potter | Aug. 7, 1945 |
| 2,517,808 | Sziklai | Aug. 8, 1950 |
| 2,628,274 | Homrighous | Feb. 10, 1953 |
| 2,813,927 | Johnson | Nov. 19, 1957 |
| 2,816,157 | Andreas et al. | Dec. 10, 1957 |
| 2,833,958 | Pensak | May 6, 1958 |
| 2,866,012 | Ginsburg et al. | Dec. 23, 1958 |
| 2,922,942 | Hergenrother | Jan. 26, 1960 |
| 2,936,333 | Higdon et al. | May 10, 1960 |

OTHER REFERENCES

RCA Technical Notes, Magnetic Video Tape Editing Apparatus, Zenel, August 9, 1957.

Storage Tubes, Kroll and Kazan, 1952.